(12) United States Patent
Teuchi et al.

(10) Patent No.: US 11,334,312 B2
(45) Date of Patent: May 17, 2022

(54) PLAYBACK DEVICE AND METHOD OF CONTROLLING THE SAME

(71) Applicant: Panasonic Intellectual Property Management Co., Ltd., Osaka (JP)

(72) Inventors: Aoi Teuchi, Osaka (JP); Kentaro Tanikawa, Osaka (JP); Tadashi Nakamura, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/764,826

(22) PCT Filed: Jul. 4, 2019

(86) PCT No.: PCT/JP2019/026695
§ 371 (c)(1),
(2) Date: May 15, 2020

(87) PCT Pub. No.: WO2020/183749
PCT Pub. Date: Sep. 17, 2020

(65) Prior Publication Data
US 2021/0397403 A1    Dec. 23, 2021

Related U.S. Application Data

(60) Provisional application No. 62/817,418, filed on Mar. 12, 2019.

(51) Int. Cl.
*G06F 3/16*    (2006.01)
*G06F 16/638*    (2019.01)
(Continued)

(52) U.S. Cl.
CPC .......... *G06F 3/165* (2013.01); *G06F 16/632* (2019.01); *G06F 16/638* (2019.01);
(Continued)

(58) Field of Classification Search
CPC ...... G06F 3/165; G06F 16/638; G06F 16/738; G06F 16/735; G06F 16/632; H04N 5/91
See application file for complete search history.

(56) References Cited

U.S. PATENT DOCUMENTS

| 9,307,440 B1* | 4/2016 | Bertz ...................... G06F 3/165 |
| 2009/0125527 A1* | 5/2009 | Murata ................. G06F 16/683 |

(Continued)

FOREIGN PATENT DOCUMENTS

| JP | 2007-317335 A | 12/2007 |
| JP | 2009-122139 A | 6/2009 |
| JP | 2012-73781 A | 4/2012 |

OTHER PUBLICATIONS

International Search Report issued in corresponding International Patent Application No. PCT/JP2019/026695, dated Sep. 17, 2019.

*Primary Examiner* — Sunghyoun Park
(74) *Attorney, Agent, or Firm* — McDermott Will & Emery LLP

(57) ABSTRACT

A playback device includes a first communicator that communicates with a terminal device through a first communication scheme and that receives music data and music information indicating an attribute of the music data from the terminal device, a music information storage that stores the music information received by the first communicator, a music player that plays back the music data received by the first communicator, a search processor that generates search data for searching for information related to the music data based on the music information, and a second communicator that communicates via a network through a second communication scheme different from the first communication scheme and that transmits the search data and receives a search result for the search data. The search processor outputs the search result received by the second communicator.

10 Claims, 12 Drawing Sheets

(51) Int. Cl.
*G06F 16/738* (2019.01)
*G06F 16/735* (2019.01)
*G06F 16/632* (2019.01)
*H04N 5/91* (2006.01)

(52) U.S. Cl.
CPC .......... *G06F 16/735* (2019.01); *G06F 16/738* (2019.01); *H04N 5/91* (2013.01)

(56) References Cited

U.S. PATENT DOCUMENTS

| | | | |
|---|---|---|---|
| 2015/0268847 A1* | 9/2015 | Lane | G10G 1/00 715/716 |
| 2017/0187771 A1* | 6/2017 | Falcon | H04L 65/1083 |
| 2019/0042647 A1* | 2/2019 | Oh | G06F 16/637 |

* cited by examiner

PLAYBACK DEVICE AND METHOD OF CONTROLLING THE SAME

CROSS-REFERENCE OF RELATED APPLICATIONS

This application is the U.S. National Phase under 35 U.S.C. § 371 of International Patent Application No. PCT/JP2019/026695, filed on Jul. 4, 2019, which in turn claims the benefit of U.S. Application No. 62/817,418, dated Mar. 12, 2019, the entire disclosures of which Applications are incorporated by reference herein.

TECHNICAL FIELD

The present disclosure relates to a playback device and a method of controlling the playback device.

BACKGROUND ART

Patent Literature 1 discloses a playback device for playing back music data. The playback device disclosed in Patent Literature 1 includes a communicator that receives music data from an external device via wireless communication and a player that plays back the received music data.

There may be a case where the user hopes to view video content related to the music data that the aforementioned playback device is playing back. In such a case, the user needs to connect the playback device, another terminal device, or the like to the internet and search for desired video content through a video distribution service or the like.

CITATION LIST

Patent Literature

PTL 1: Japanese Unexamined Patent Application Publication No. 2007-317335

SUMMARY OF THE INVENTION

Technical Problem

The present disclosure provides a playback device capable of searching for information related to music data without involving a user and to a method of controlling the playback device.

Solution to Problem

A playback device according to the present disclosure is for playing back music data, and the playback device comprises: a first communicator that communicates with an external device through a first communication scheme and that receives the music data and music information indicating an attribute of the music data from the external device; a music information storage that stores the music information received by the first communicator; a music player that plays back the music data received by the first communicator; a search data generator that, based on the music information, generates search data for searching for information related to the music data; a second communicator that communicates via a network through a second communication scheme different from the first communication scheme and that transmits the search data and receives a search result for the search data; and a search result output that outputs the search result received by the second communicator.

Advantageous Effect of Invention

The playback device according to the present disclosure is capable of searching for information related to music data without involving a user.

DESCRIPTION OF EXEMPLARY EMBODIMENTS

Hereinafter, some embodiments will be described in detail with reference to the drawings. Note, however, that any description more elaborate than necessary may be omitted. For example, features that are already well known may not be described in detail, or duplicate descriptions of substantially identical configurations may be omitted. This is for keeping the following descriptions from becoming more lengthy than necessary and for facilitating an understanding of a person skilled in the art.

It is to be noted that the inventors provide the appended drawings and the following descriptions merely to help a person skilled in the art understand the present disclosure at a sufficient level, and these drawings and descriptions are not intended to limit the subject matter set forth in the claims.

Embodiment 1

Figure 1:
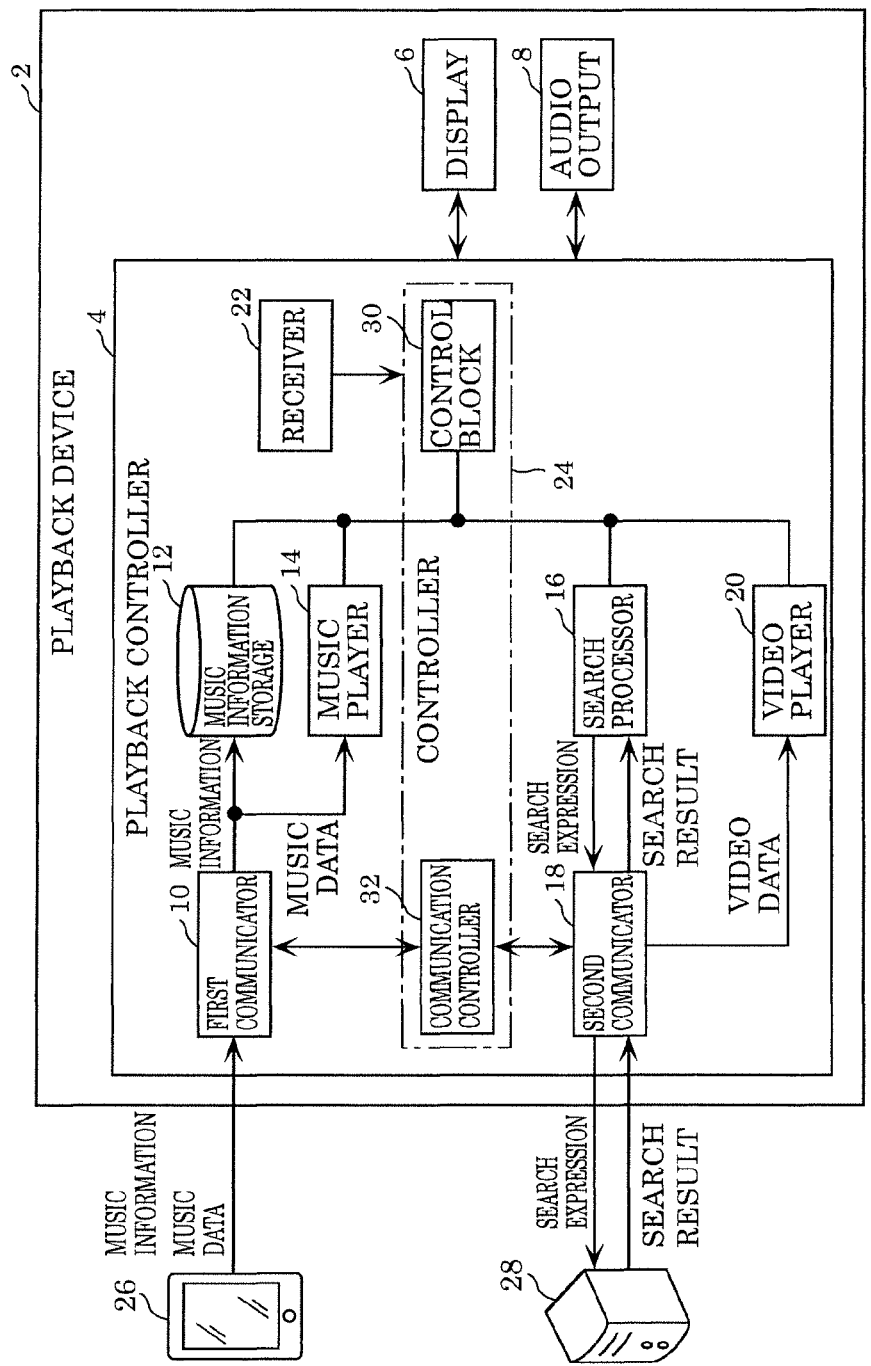
FIG. 1 is a block diagram illustrating a configuration of a playback device according to Embodiment 1.
Figure 2:
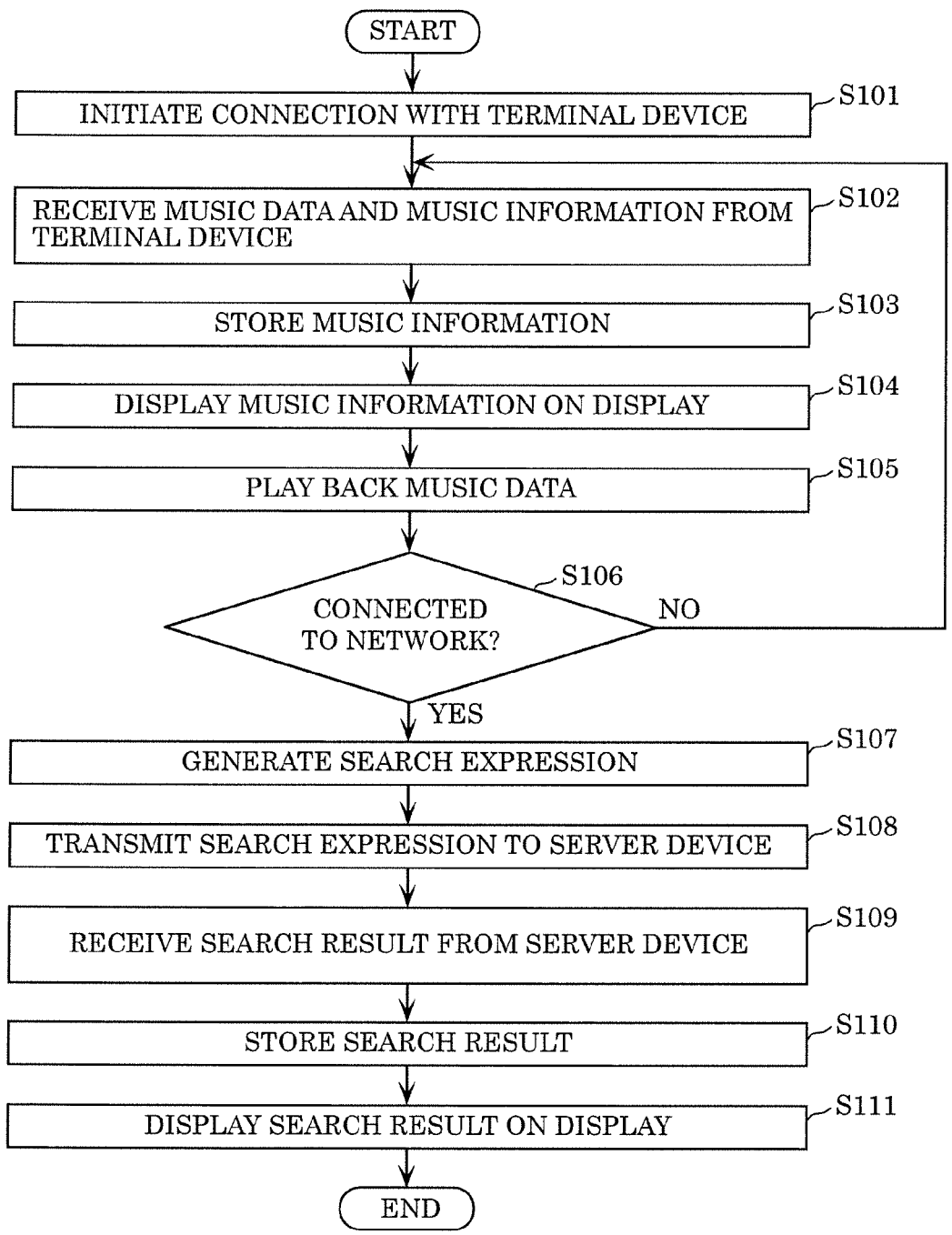
FIG. 2 is a flowchart illustrating a flow of an operation of the playback device according to Embodiment 1.
Figure 3:
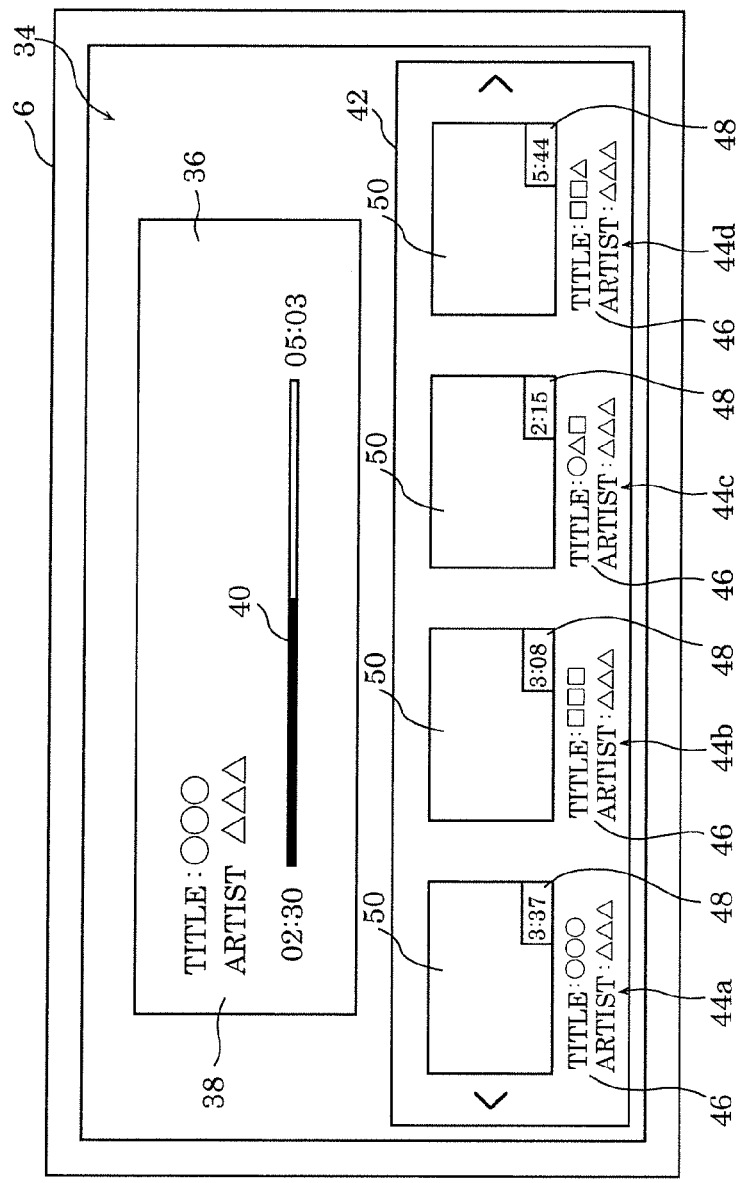
FIG. 3 illustrates an example of a playback screen displayed on a display of the playback device according to Embodiment 1.

With reference to FIGS. 1 to 3, Embodiment 1 will be described below.

1-1. Configuration of Playback Device

First, with reference to FIG. 1, a configuration of playback device 2 according to Embodiment 1 will be described. FIG.

1 is a block diagram illustrating a configuration of playback device 2 according to Embodiment 1.

In the present embodiment, playback device 2 is an audio player for playing back music data. As illustrated in FIG. 1, playback device 2 includes playback controller 4, display 6, and audio output 8.

Playback controller 4 includes first communicator 10, music information storage 12, music player 14, search processor 16 (an example of a search data generator and a search result output), second communicator 18, video player 20, receiver 22, and controller 24.

First communicator 10 communicates with terminal device 26 (an example of an external device) through a first communication scheme. The first communication scheme is a wireless communication scheme, such as Bluetooth (registered trademark), for example. Terminal device 26 is, for example but not limited to, a smartphone or a tablet terminal. Terminal device 26 has a function of transmitting music information and music data to playback device 2.

Music data is audio data transmitted through, for example but not limited to, Advanced Audio Distribution Profile (A2DP) or Audio/Video Remote Control Profile (AVRCP). Music information is metadata that indicates an attribute of music data. Music information includes, for example but not limited to, (a) track information that indicates the title of a track, the name of an artist, the title of a music album, the duration of a track, and the like; (b) playback operation information that indicates a music data playback operation, such as play, stop, or pause; and (c) playback position information that indicates the playback position of music data.

First communicator 10 receives music information and music data from terminal device 26. First communicator 10 outputs received music information and music data to music information storage 12 and music player 14, respectively.

Music information storage 12 is a memory that stores music information received by first communicator 10.

Music player 14 plays back music data received by first communicator 10 and outputs the played back music data to audio output 8.

Search processor 16 generates a search expression (an example of search data) for searching for video data related to music data being played back by music player 14, based on music information stored in music information storage 12. Video data related to music data includes, for example but not limited to, a music video for the track corresponding to the music data and a music video for another track on the music album containing the track corresponding to the music data. A search expression is a keyword search expression that includes, for example but not limited to, the title of a track, the name of an artist, or the name of a music album. Moreover, search processor 16 stores a search result (described later) received by second communicator 18 into an internal memory and outputs the search result to display 6 to cause display 6 to display the search result.

Second communicator 18 communicates with server device 28 via a network, such as the internet, through a second communication scheme different from the first communication scheme. The second communication scheme is a wireless communication scheme, such as a Wi-Fi (registered trademark) wireless local area network (LAN), for example. Server device 28 is, for example, a video distribution server for distributing video data through a video distribution service, such as YouTube (registered trademark).

Second communicator 18 transmits a search expression generated by search processor 16 to server device 28 via a network. Second communicator 18 receives a search result for a search expression and video data corresponding to video information included in the search result from server device 28 via a network. Second communicator 18 outputs received search result and video data to search processor 16 and video player 20, respectively.

A search result is a result from a search performed in server device 28 based on a search expression generated by search processor 16. A search result includes video information related to video data hit by a search. Video information indicates an attribute of video data. Video information includes, for example but not limited to, the title of a video, the name of an artist, the playback duration, a thumbnail, and Uniform Resource Locator (URL).

Video player 20 plays back video data received by second communicator 18 and causes display 6 to display the played back video data.

Receiver 22 receives a user operation via a remote controller or the like. Receiver 22 receives, as a user operation, for example but not limited to, (a) a playback operation, such as play, stop, or pause, for music data; (b) a playback operation, such as play, stop, or pause, for video data, and (c) a selection operation for video information included in a search result. Receiver 22 outputs an operation signal that indicates the content of a user operation to controller 24.

Controller 24 controls playback device 2 as a whole. Controller 24 includes control block 30 and communication controller 32.

Control block 30 controls each of music information storage 12, music player 14, search processor 16, and video player 20 based on an operation signal from receiver 22. Control block 30 also controls the screen to be displayed on display 6 and the audio to be output from audio output 8, based on an operation signal from receiver 22.

Communication controller 32 controls each of first communicator 10 and second communicator 18 based on an operation signal from receiver 22.

Display 6 is, for example, a liquid-crystal display panel. Display 6 displays, for example but not limited to, music information stored in music information storage 12, a search result stored in search processor 16, and video data played back by video player 20. Display 6 and receiver 22 may be integrated into a touch panel.

Audio output 8 is, for example, an amplifier and a loudspeaker. Audio output 8 outputs an audio (music) that is based on music data played back by music player 14.

1-2. Operation of Playback Device

Now, with reference to FIGS. 2 and 3, an operation of playback device 2 according to Embodiment 1 will be described. FIG. 2 is a flowchart illustrating a flow of an operation of playback device 2 according to Embodiment 1. FIG. 3 illustrates an example of playback screen 34 displayed on display 6 of playback device 2 according to Embodiment 1.

As illustrated in FIG. 2, first, a connection between first communicator 10 of playback device 2 and terminal device 26 is initiated (S101). Specifically, pairing is carried out between first communicator 10 and terminal device 26 in accordance with the Bluetooth (registered trademark) standard, for example.

A user operates application software installed in terminal device 26, and this causes terminal device 26 to transmit music data and music information to first communicator 10. Thus, first communicator 10 receives the music data and the music information from terminal device 26 (S102). First communicator 10 outputs the received music information and the received music data to music information storage 12 and music player 14, respectively.

Music information storage 12 stores the music information received from first communicator 10 (S103). Control block 30 causes display 6 to display the music information stored in music information storage 12 (S104). Music player 14 plays back the music data received from first communicator 10 (S105) and outputs the played back music data to audio output 8. This causes audio output 8 to output an audio that is based on the music data being played back by music player 14. The user can cause the music data to be played back with the use of a remote controller or the like, for example.

At this point, display 6 displays playback screen 34 such as the one illustrated in FIG. 3, for example. In an upper half area of playback screen 34, music information display area 36 is displayed in the form of a Graphical User Interface (GUI) for displaying the music information related to the music data being played back. Displayed as the music information in music information display area 36 include track information 38 that includes the title of the track and the name of the artist and seek bar 40 that indicates the playback position of the music data and the duration of the track, for example.

Referring back to the flowchart illustrated in FIG. 2, search processor 16 determines whether second communicator 18 is connected to the network (S106). In a case where second communicator 18 is not connected to the network (NO in S106), the flow returns to step S102 described above.

In a case where second communicator 18 is connected to the network (YES in S106), search processor 16 generates a search expression for searching for video data related to the music data being played back by music player 14, based on the music information stored in music information storage 12 (S107). Second communicator 18 transmits the search expression generated by search processor 16 to server device 28 via the network (S108). This causes server device 28 to search for video data based on the received search expression.

Second communicator 18 receives a search result for the search expression from server device 28 via the network (S109). Second communicator 18 outputs the received search result to search processor 16. Search processor 16 stores the search result received from second communicator 18 into an internal memory (S110) and outputs the search result to display 6 to cause display 6 to display the search result (S111).

At this point, as illustrated in FIG. 3, in a lower half area of playback screen 34, search result display area 42 is displayed in the form of a GUI for displaying the search result on the video data related to the music data being played back, for example. In search result display area 42, a plurality of pieces of video information 44a, 44b, 44c, and 44d (44a to 44d) are displayed as the search result. Displayed in each piece of video information 44a to 44d include track information 46 that includes the title of the video and the name of the artist, playback duration 48 of the video data, and thumbnail 50 of the video data.

If the user wants to view the video data related to the music data that is being played back, the user selects the video information that the user wants to view from video information 44a to 44d displayed in search result display area 42 with the use of a remote controller or the like, for example. For example, in a case where receiver 22 has received an operation for selecting video information 44a (an example of specific video information) from video information 44a to 44d, second communicator 18 receives video data (an example of specific video data) corresponding to video information 44a from server device 28.

Video player 20 plays back the video data received by second communicator 18 and causes display 6 to display the played back video data. This causes the video data corresponding to video information 44a to be displayed in full-screen display on display 6. The playback of the music data is stopped while the video data is being played back.

1-3. Advantageous Effects

As described above, in the present embodiment, playback device 2 is for playing back music data. Playback device 2 includes first communicator 10 that communicates with terminal device 26 through a first communication scheme and that receives music data and music information indicating an attribute of the music data from terminal device 26, music information storage 12 that stores the music information received by first communicator 10, music player 14 that plays back the music data received by first communicator 10, search processor 16 that, based on the music information, generates a search expression for searching for information related to the music data, and second communicator 18 that communicates via a network through a second communication scheme different from the first communication scheme and that transmits the search expression and receives a search result for the search expression. Search processor 16 outputs the search result received by second communicator 18.

With this configuration, search processor 16 generates a search expression for searching for information related to music data based on music information. Second communicator 18 transmits the generated search expression and receives a search result for the search expression. This can render it unnecessary for the user to search for the information himself/herself. Consequently, the information related to the music data can be searched for without involving the user.

In the present embodiment, search processor 16 outputs a search result to display 6 to cause display 6 to display the search result.

This allows the user to obtain information related to the music data with ease by seeing the search result displayed on display 6.

In the present embodiment, a search expression is data for searching for video data related to music data. A search result includes video information indicating an attribute of the video data. Second communicator 18 receives the video data corresponding to the video information included in the search result from server device 28. Playback device 2 further includes video player 20 that plays back the video data received by second communicator 18 and causes display 6 to display the played back video data.

This makes it possible to search for the video data related to the music data without involving the user. Then, the user can view the video data that he/she wants to view from the search result displayed on display 6.

In the present embodiment, playback device 2 further includes receiver 22 that receives a user operation. In a case where receiver 22 has received an operation for selecting specific video information from the search result displayed on display 6, second communicator 18 receives specific video data corresponding to the specific video information from server device 28. Video player 20 plays back the specific video data received by second communicator 18 and causes display 6 to display the played back specific video data.

This allows the user to select and view the video data that he/she wants to view from the search result displayed on display 6.

In the present embodiment, a method of controlling playback device 2 is a method of controlling playback device 2 for playing back music data. This method includes (a) receiving music data and music information indicating an attribute of the music data from terminal device 26 by communicating with terminal device 26 through a first communication scheme, (b) storing the music information received in the (a) into music information storage 12, (c) playing back the music data received in the (a), (d) generating a search expression for searching for information related to the music data based on the music information, (e) transmitting the search expression and receiving a search result for the search expression by communicating via a network through a second communication scheme different from the first communication scheme, and (f) outputting the search result received in the (e).

This makes it possible to search for the information related to the music data without involving the user, as in the case described above.

Embodiment 2

2-1. Configuration of Playback Device

Figure 4:
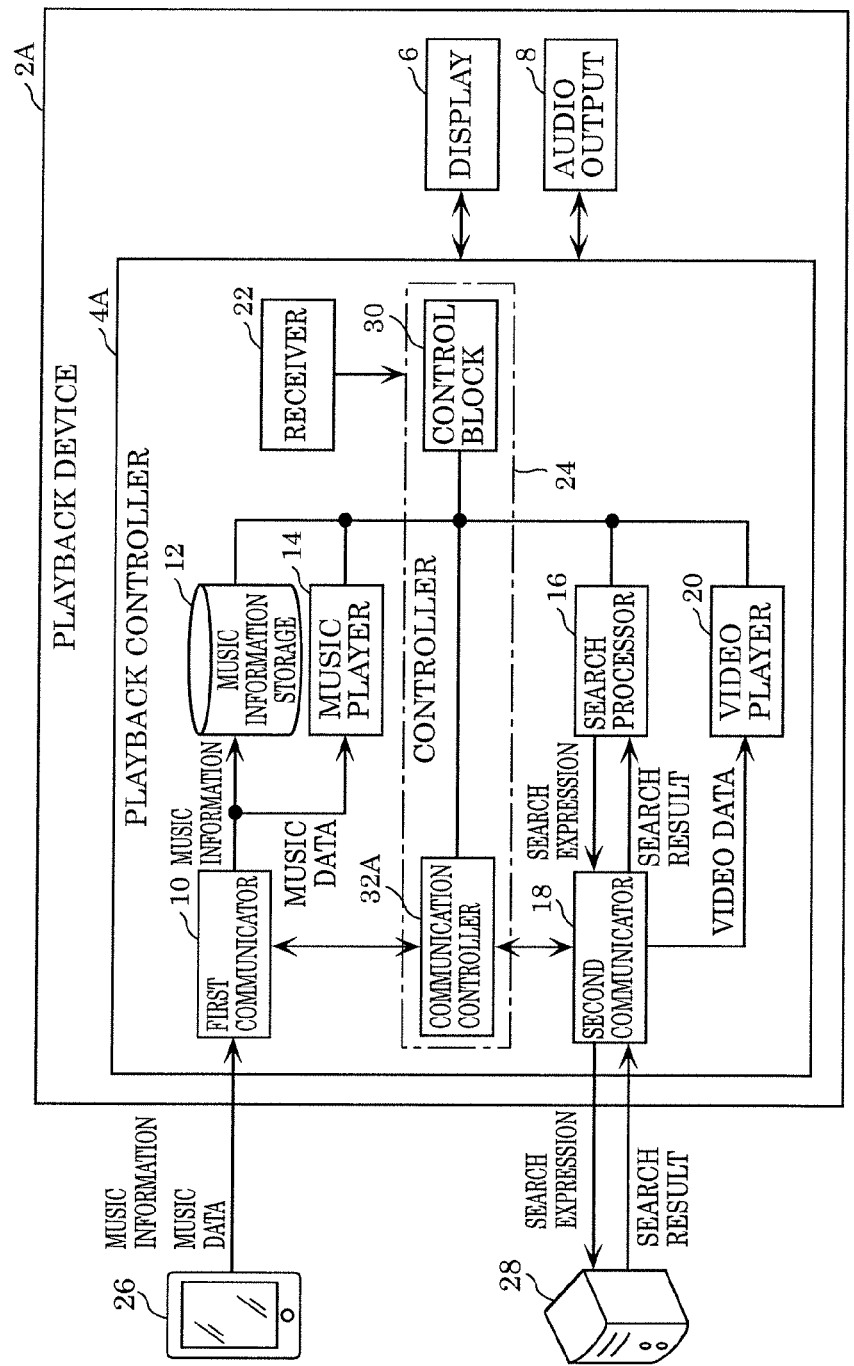
FIG. 4 is a block diagram illustrating a configuration of a playback device according to Embodiment 2.

Now, with reference to FIG. 4, a configuration of playback device 2A according to Embodiment 2 will be described. FIG. 4 is a block diagram illustrating a configuration of playback device 2A according to Embodiment 2. In each of the following embodiments, constituent elements identical to those in Embodiment 1 described above will be given identical reference characters, and descriptions thereof will be omitted.

As illustrated in FIG. 4, playback device 2A according to the present embodiment differs from the counterpart in Embodiment 1 described above in terms of the process of communication controller 32A of playback controller 4A.

Communication controller 32A can set the wireless communication band of the second communication scheme to either one of 2.4 GHz and 5 GHz, for example. In a case where the wireless communication band of the first communication scheme and the wireless communication band of the second communication scheme are identical (e.g., 2.4 GHz), communication controller 32A switches the communication mode of second communicator 18 to either one of a low-speed communication mode and a high-speed communication mode having a higher communication speed than the low-speed communication mode, based on music information (playback operation information) stored in music information storage 12. The communication speed of the low-speed communication mode is, for example, 1 Mbps. The communication speed of the high-speed communication mode is, for example, 30 Mbps.

Specifically, communication controller 32A switches the communication mode of second communicator 18 to the low-speed communication mode in a case where music data is being played back. Meanwhile, communication controller 32A switches the communication mode of second communicator 18 to the high-speed communication mode in a case where the playback of music data is being stopped. That the playback is being stopped refers to a state in which the playback of music data is being stopped or paused.

2-2. Operation of Playback Device

Figure 5:
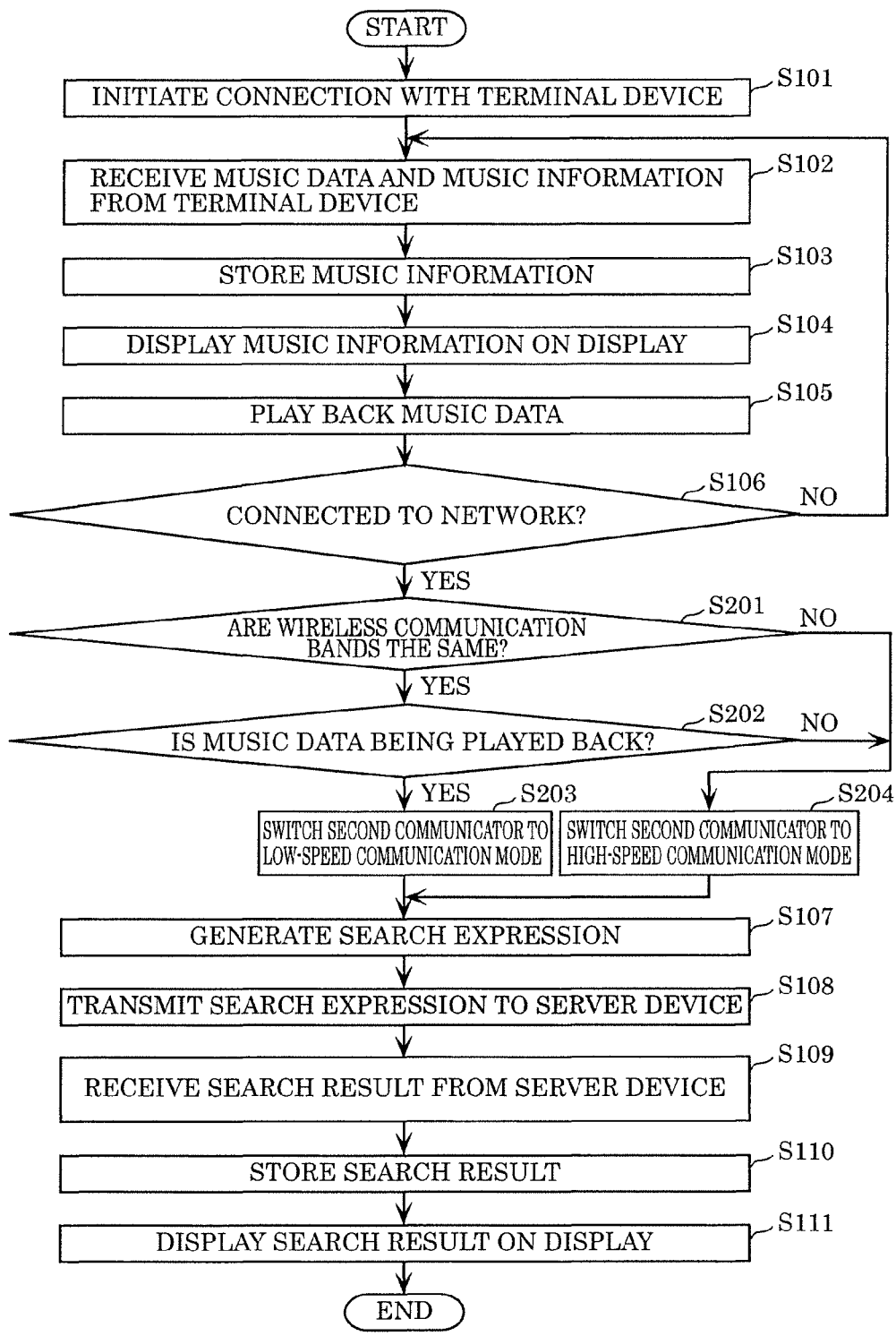
FIG. 5 is a flowchart illustrating a flow of an operation of the playback device according to Embodiment 2.
Figure 6:
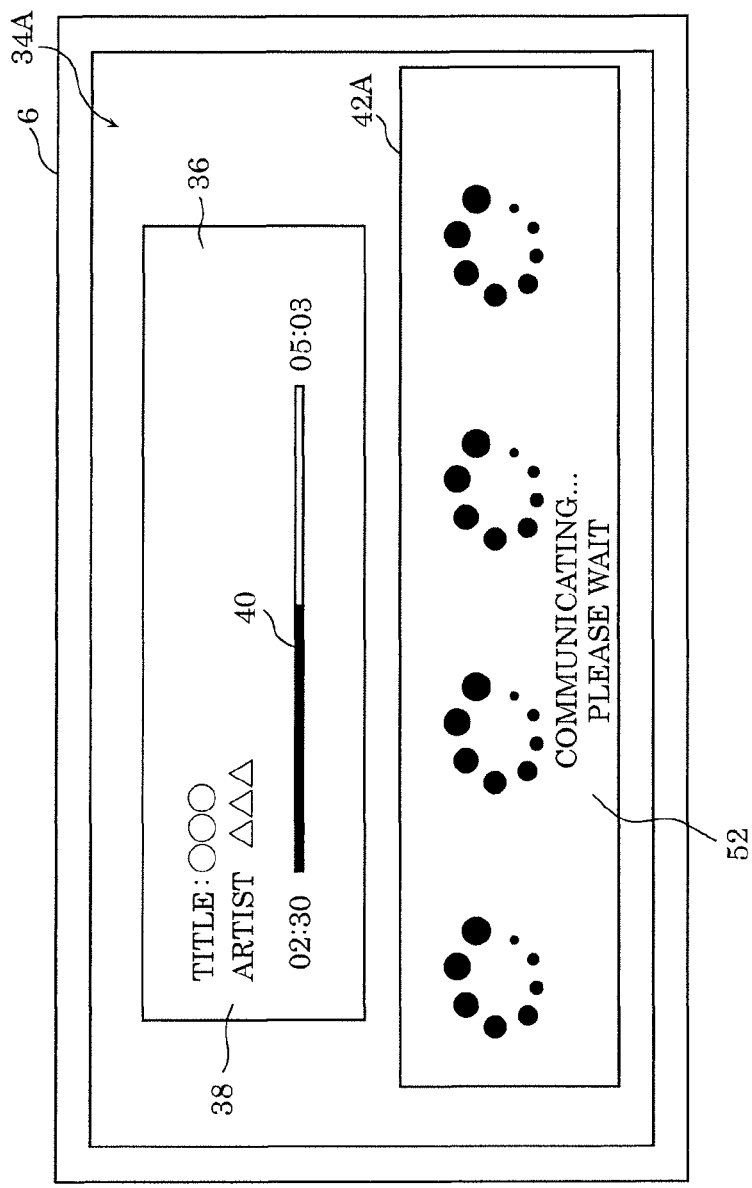
FIG. 6 illustrates an example of a playback screen displayed on a display of the playback device according to Embodiment 2.

Now, with reference to FIGS. 5 and 6, an operation of playback device 2A according to Embodiment 2 will be described. FIG. 5 is a flowchart illustrating a flow of an operation of playback device 2A according to Embodiment 2. FIG. 6 illustrates an example of playback screen 34A displayed on display 6 of playback device 2A according to Embodiment 2. In each of the following embodiments, processes identical to those in the flowchart illustrated in FIG. 2 and described in Embodiment 1 above will be given identical step numbers, and descriptions thereof will be omitted.

As illustrated in FIG. 5, first, steps S101 to S106 are executed in manners similar to those in Embodiment 1 described above. In a case where second communicator 18 is connected to the network in step S106 (YES in S106), communication controller 32A determines whether the wireless communication band of the first communication scheme and the wireless communication band of the second communication scheme are identical (S201).

In a case where the wireless communication band of the first communication scheme and the wireless communication band of the second communication scheme are identical (YES in S201), communication controller 32A determines whether the music data is being played back, based on the music information stored in music information storage 12 (S202).

In a case where the music data is being played back (YES in S202), communication controller 32A switches the communication mode of second communicator 18 to the low-speed communication mode (S203). Thereafter, steps S107 to S111 are executed in manners similar to those in Embodiment 1 described above. In other words, second communicator 18 communicates with server device 28 in the low-speed communication mode while the music data is being played back.

Back in step S202, in a case where the playback of the music data is being stopped (NO in S202), communication controller 32A switches the communication mode of second communicator 18 to the high-speed communication mode (S204). Thereafter, steps S107 to S111 are executed in manners similar to those in Embodiment 1 described above. In other words, second communicator 18 communicates with server device 28 in the high-speed communication mode while the playback of the music data is being stopped.

Back in step S201, in a case where the wireless communication band of the first communication scheme and the wireless communication band of the second communication scheme are different (NO in S201), communication controller 32A switches the communication mode of second communicator 18 to the high-speed communication mode (S204). Thereafter, steps S107 to S111 are executed in manners similar to those in Embodiment 1 described above.

When the communication mode of second communicator 18 is switched, as illustrated in FIG. 6, for example, search result display area 42A in playback screen 34A displays message 52 asking the user to wait until a search result is displayed. This allows the user to grasp the current communication status.

2-3. Advantageous Effects

As described above, in the present embodiment, the first communication scheme and the second communication scheme are each a wireless communication scheme. Playback device 2A further includes communication controller 32A that, in a case where the wireless communication band of the first communication scheme and the wireless communication band of the second communication scheme are identical, switches the communication mode of second communicator 18 to either one of the low-speed communication mode and the high-speed communication mode having a higher communication speed than the low-speed communication mode, based on music information.

With this configuration, in a case where the wireless communication band of the first communication scheme and the wireless communication band of the second communication scheme are identical, there is a possibility that interference between radio waves transmitted and received by first communicator 10 and radio waves transmitted and received by second communicator 18 keeps music data and video data from being played back properly. Therefore, communication controller 32A switches the communication mode of second communicator 18 to either one of the low-speed communication mode and the high-speed communication mode based on music information. This can keep radio waves transmitted and received by first communicator 10 and radio waves transmitted and received by second communicator 18 from interfering with each other. Consequently, music data and video data can be played back stably.

In the present embodiment, communication controller 32A switches the communication mode of second communicator 18 to the low-speed communication mode in a case where music data is being played back and switches the communication mode of second communicator 18 to the high-speed communication mode in a case where the playback of music data is being stopped.

With this configuration, there is an increased possibility that radio waves transmitted and received by first communicator 10 and radio waves transmitted and received by second communicator 18 interfere with each other while music data is being played back. Therefore, the communication mode of second communicator 18 is switched to the low-speed communication mode in a case where music data is being played back, and this can keep radio waves transmitted and received by first communicator 10 and radio waves transmitted and received by second communicator 18 from interfering with each other. Meanwhile, the possibility that radio waves transmitted and received by first communicator 10 and radio waves transmitted and received by second communicator 18 interfere with each other is reduced while the playback of music data is being stopped. Therefore, the communication mode of second communicator 18 is switched to the high-speed communication mode in a case where the playback of music data is being stopped, and this allows the search for and the reception of video data and so on to be processed smoothly.

Embodiment 3

3-1. Configuration of Playback Device

Figure 7:
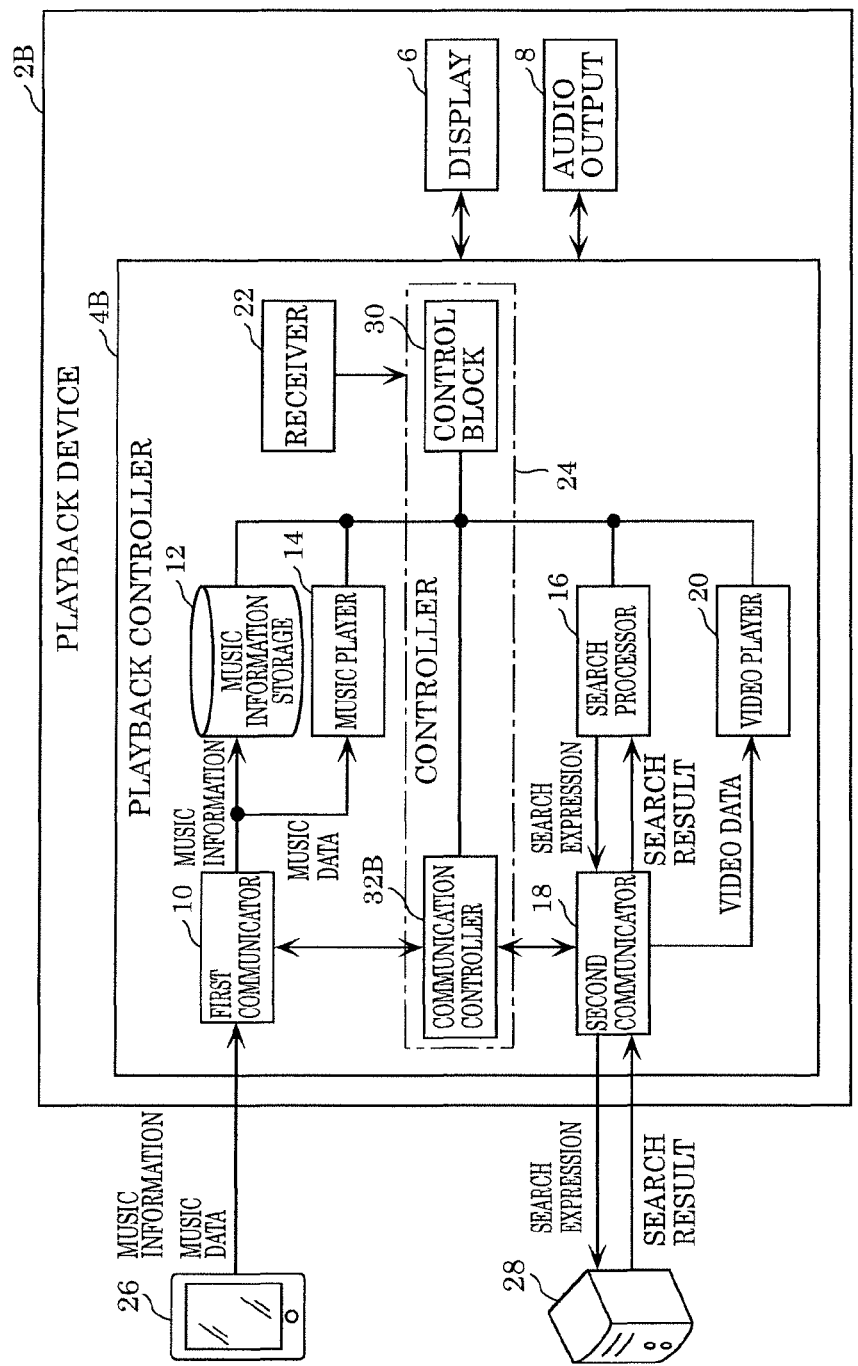
FIG. 7 is a block diagram illustrating a configuration of a playback device according to Embodiment 3.

Now, with reference to FIG. 7, a configuration of playback device 2B according to Embodiment 3 will be described. FIG. 7 is a block diagram illustrating a configuration of playback device 2B according to Embodiment 3.

As illustrated in FIG. 7, playback device 2B according to the present embodiment differs from the counterpart in Embodiment 2 described above in terms of the process of communication controller 32B of playback controller 4B.

In a case where the wireless communication band of the first communication scheme and the wireless communication band of the second communication scheme are identical, communication controller 32B switches the communication mode of second communicator 18 to either one of the low-speed communication mode and the high-speed communication mode, based on music information (playback position information) stored in music information storage 12.

Specifically, in a case where the playback position of music data is at a playback start position (at the beginning of an audio track), communication controller 32B switches the communication mode of second communicator 18 to the low-speed communication mode. Meanwhile, in a case where the playback position of music data is at a playback end position (at the end of an audio track), communication controller 32B switches the communication mode of second communicator 18 to the high-speed communication mode.

3-2. Operation of Playback Device

Figure 8:
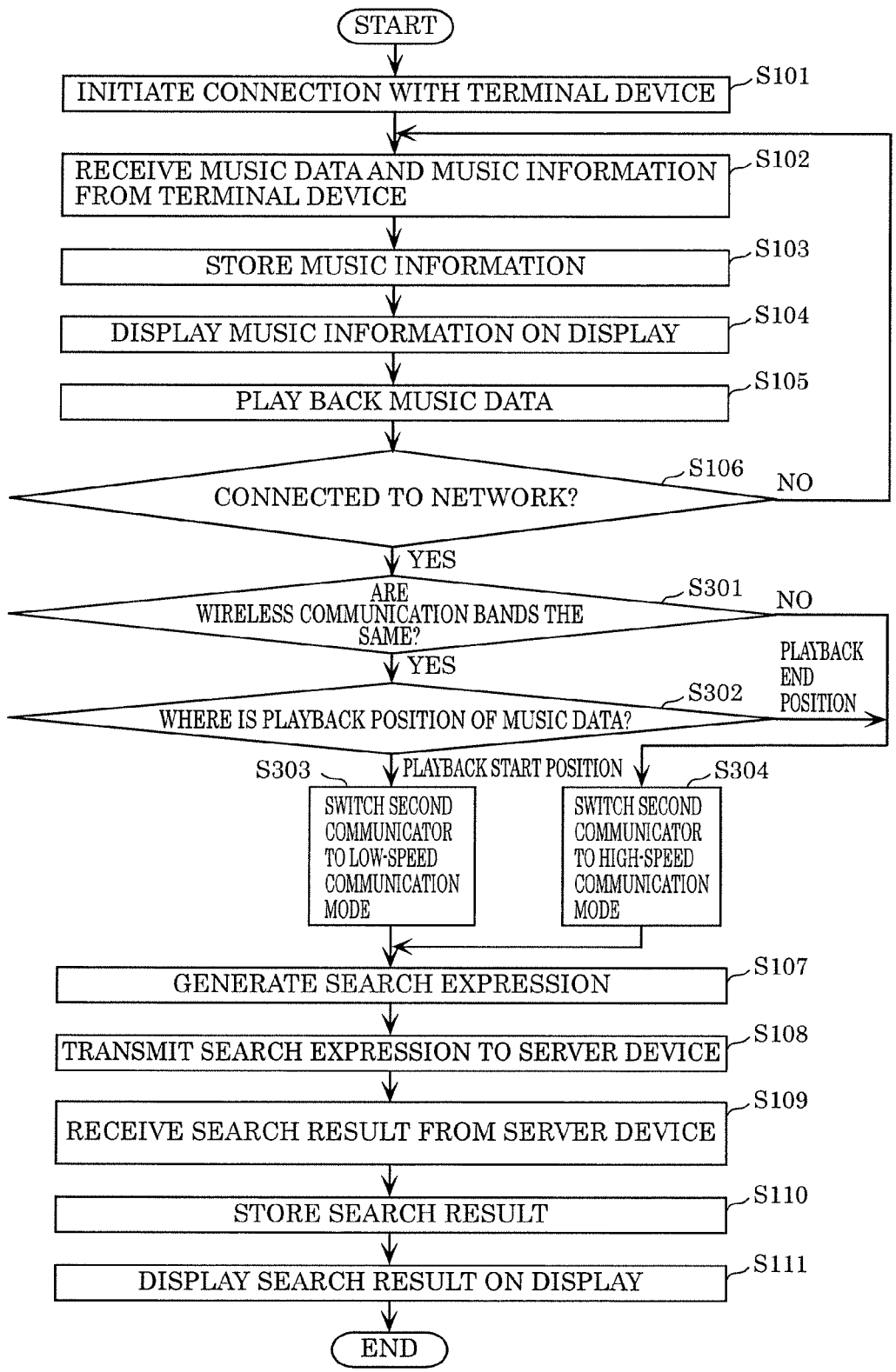
FIG. 8 is a flowchart illustrating a flow of an operation of the playback device according to Embodiment 3.

Now, with reference to FIG. 8, an operation of playback device 2B according to Embodiment 3 will be described. FIG. 8 is a flowchart illustrating a flow of an operation of playback device 2B according to Embodiment 3.

As illustrated in FIG. 8, first, steps S101 to S106 are executed in manners similar to those in Embodiment 1 described above. In a case where second communicator 18 is connected to the network in step S106 (YES in S106), communication controller 32B determines whether the wireless communication band of the first communication scheme and the wireless communication band of the second communication scheme are identical (S301).

In a case where the wireless communication band of the first communication scheme and the wireless communication band of the second communication scheme are identical (YES in S301), communication controller 32B determines whether the playback position of the music data is at the playback start position or at the playback end position, based on the music information stored in music information storage 12 (S302).

In a case where the playback position of the music data is at the playback start position ("PLAYBACK START POSITION" in S302), communication controller 32B switches the communication mode of second communicator 18 to the low-speed communication mode (S303). Thereafter, steps S107 to S111 are executed in manners similar to those in Embodiment 1 described above. In other words, second communicator 18 communicates with server device 28 in the low-speed communication mode while the music data is being played back.

Back in step S302, in a case where the playback position of the music data is at the playback end position ("PLAYBACK END POSITION" in S302), communication controller 32B switches the communication mode of second communicator 18 to the high-speed communication mode (S304). Thereafter, steps S107 to S111 are executed in manners similar to those in Embodiment 1 described above. In other words, second communicator 18 communicates with server device 28 in the high-speed communication mode while the playback of the music data is being stopped.

Back in step S301, in a case where the wireless communication band of the first communication scheme and the wireless communication band of the second communication scheme are different (NO in S301), communication controller 32B switches the communication mode of second communicator 18 to the high-speed communication mode (S304). Thereafter, steps S107 to S111 are executed in manners similar to those in Embodiment 1 described above.

3-3. Advantageous Effects

As described above, in the present embodiment, communication controller 32B switches the communication mode of second communicator 18 to the low-speed communication mode in a case where the playback position of music data is at the playback start position and switches the communication mode of second communicator 18 to the high-speed communication mode in a case where the playback position of music data is at the playback end position.

With this configuration, the music data starts being played back from the playback start position in a case where the playback position of the music data is at the playback start position, and there is an increased possibility that radio waves transmitted and received by first communicator 10 and radio waves transmitted and received by second communicator 18 interfere with each other. Therefore, the communication mode of second communicator 18 is switched to the low-speed communication mode in a case where the playback position of the music data is at the playback start position, and this can keep radio waves transmitted and received by first communicator 10 and radio waves transmitted and received by second communicator 18 from interfering with each other. Meanwhile, the playback of the music data is to stop soon in a case where the playback position of the music data is at the playback end position, and thus the possibility that radio waves transmitted and received by first communicator 10 and radio waves transmitted and received by second communicator 18 interfere with each other is reduced. Therefore, the communication mode of second communicator 18 is switched to the high-speed communication mode in a case where the playback position of the music data is at the playback end position, and this allows the search for and the reception of video data and so on to be processed smoothly.

Embodiment 4

4-1. Configuration of Playback Device

Figure 9:
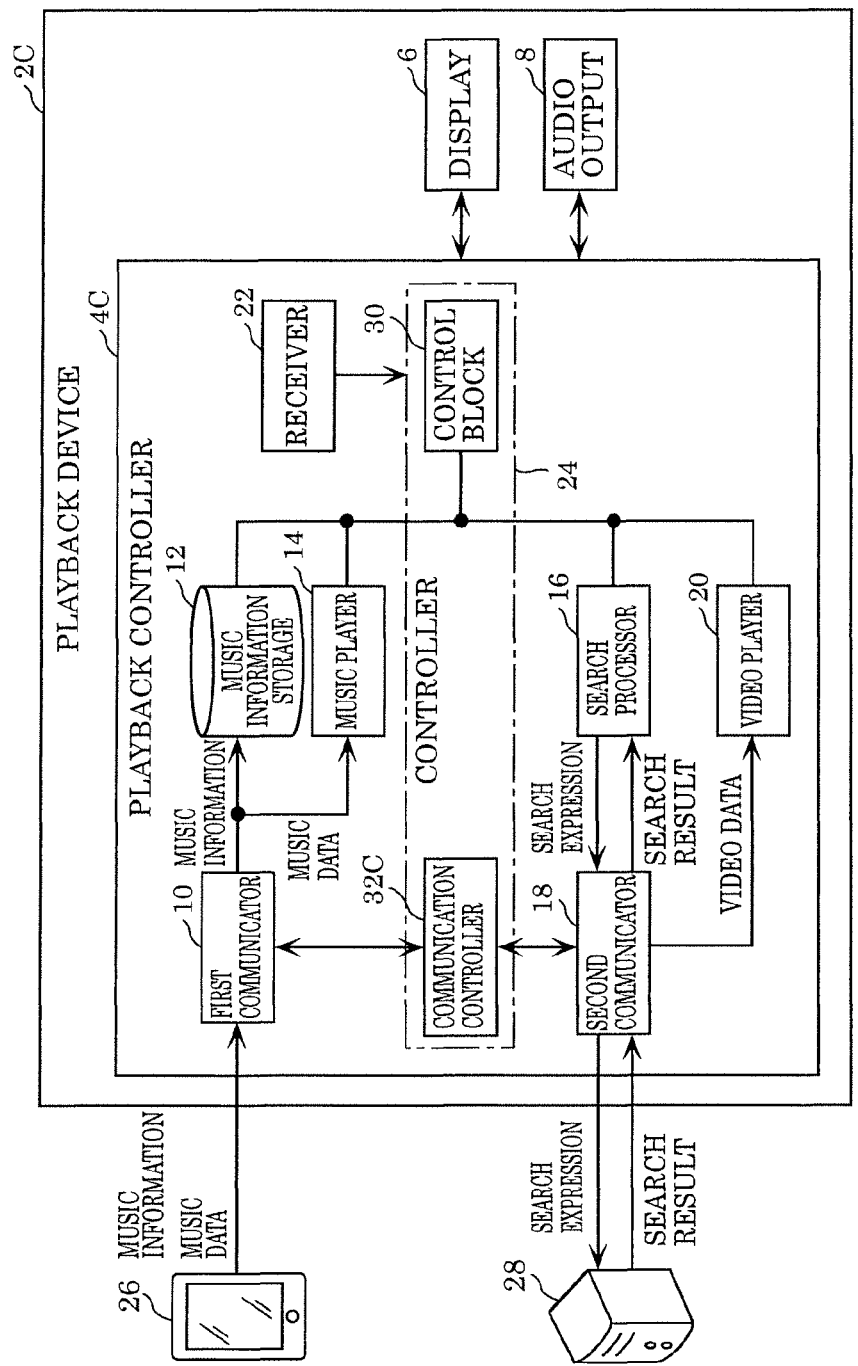
FIG. 9 is a block diagram illustrating a configuration of a playback device according to Embodiment 4.

Now, with reference to FIG. 9, a configuration of playback device 2C according to Embodiment 4 will be described. FIG. 9 is a block diagram illustrating a configuration of playback device 2C according to Embodiment 4.

As illustrated in FIG. 9, playback device 2C according to the present embodiment differs from the counterpart in Embodiment 2 described above in terms of the process of communication controller 32C of playback controller 4C.

In a case where the wireless communication band of the first communication scheme and the wireless communication band of the second communication scheme are identical, communication controller 32C switches the communication mode of second communicator 18 to either one of the low-speed communication mode and the high-speed communication mode, based on the playback status of music data.

Specifically, communication controller 32C switches the communication mode of second communicator 18 to the low-speed communication mode in a case where buffer underflow has been detected in music data received by first communicator 10. Meanwhile, communication controller 32C switches the communication mode of second communicator 18 to the high-speed communication mode in a case where no buffer underflow is detected in music data received by first communicator 10.

4-2. Operation of Playback Device

Now, with reference to FIG. 10, an operation of playback device 2C according to Embodiment 4 will be described.

Figure 10:
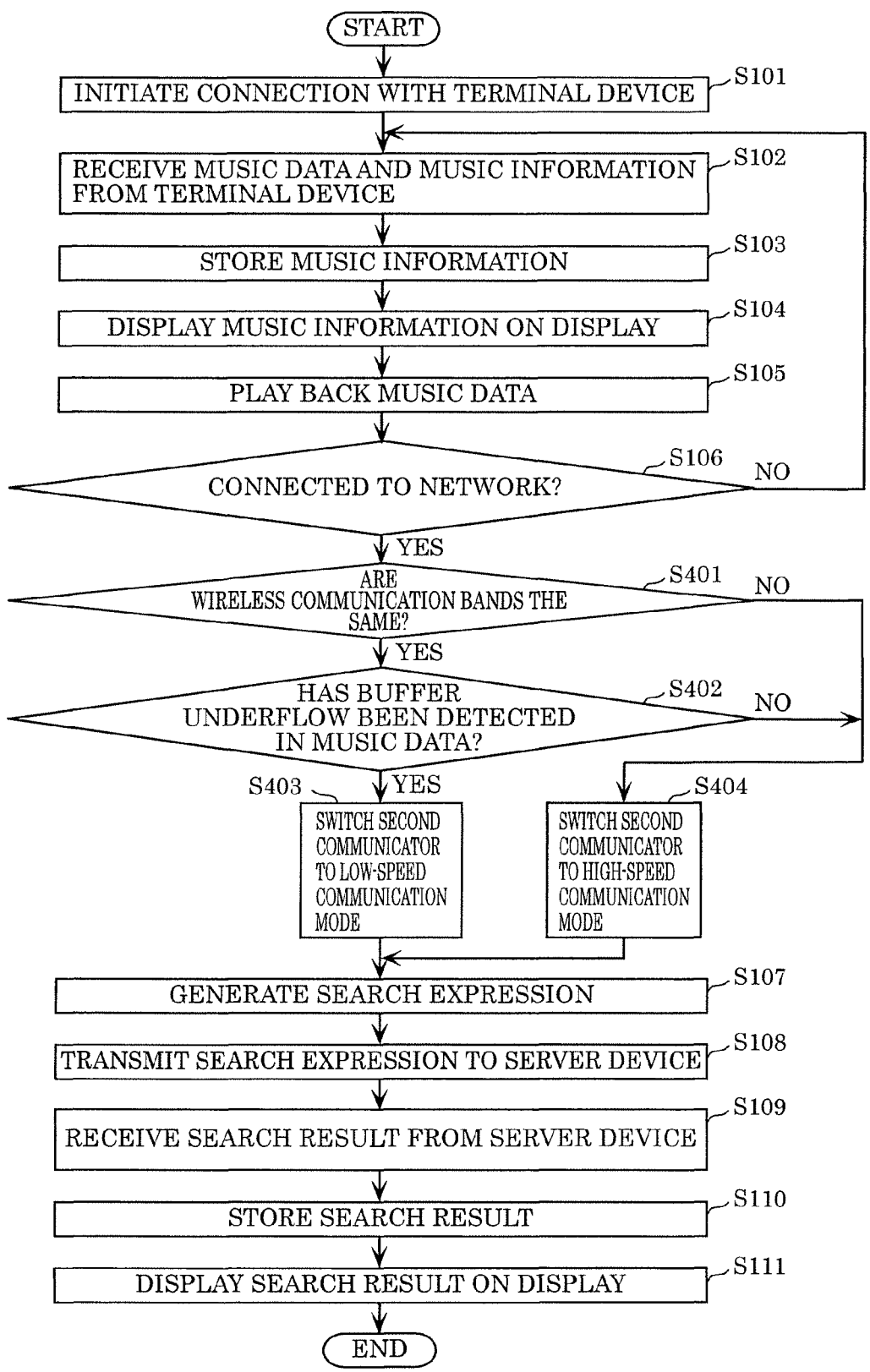
FIG. 10 is a flowchart illustrating a flow of an operation of the playback device according to Embodiment 4.

FIG. 10 is a flowchart illustrating a flow of an operation of playback device 2C according to Embodiment 4.

As illustrated in FIG. 10, first, steps S101 to S106 are executed in manners similar to those in Embodiment 1 described above. In a case where second communicator 18 is connected to the network in step S106 (YES in S106), communication controller 32C determines whether the wireless communication band of the first communication scheme and the wireless communication band of the second communication scheme are identical (S401).

In a case where the wireless communication band of the first communication scheme and the wireless communication band of the second communication scheme are identical (YES in S401), communication controller 32C determines whether any buffer underflow has been detected in the music data, based on the music data received by first communicator 10 (S402).

In a case where buffer underflow has been detected in the music data (YES in S402), communication controller 32C switches the communication mode of second communicator 18 to the low-speed communication mode (S403). Thereafter, steps S107 to S111 are executed in manners similar to those in Embodiment 1 described above. In a case where no buffer underflow is detected in the music data for a certain period in step S107 and thereafter, communication controller 32C may switch the communication mode of second communicator 18 from the low-speed communication mode to the high-speed communication mode.

Back in step S402, in a case where no buffer underflow is detected in the music data (NO in S402), communication controller 32C switches the communication mode of second communicator 18 to the high-speed communication mode (S404). Thereafter, steps S107 to S111 are executed in manners similar to those in Embodiment 1 described above.

Back in step S401, in a case where the wireless communication band of the first communication scheme and the wireless communication band of the second communication scheme are different (NO in S401), communication controller 32C switches the communication mode of second communicator 18 to the high-speed communication mode (S404). Thereafter, steps S107 to S111 are executed in manners similar to those in Embodiment 1 described above.

4-3. Advantageous Effects

As described above, in the present embodiment, communication controller 32C switches the communication mode of second communicator 18 to the low-speed communication mode in a case where buffer underflow has been detected in music data received by first communicator 10.

With this configuration, there is a possibility that the playback of music data is interrupted when buffer underflow occurs in the music data received by first communicator 10. Therefore, the communication mode of second communicator 18 is switched to the low-speed communication mode in a case where buffer underflow has been detected in the music data received by first communicator 10, and this can keep the playback of the music data from being interrupted.

Embodiment 5

5-1. Configuration of Playback Device

Figure 11:
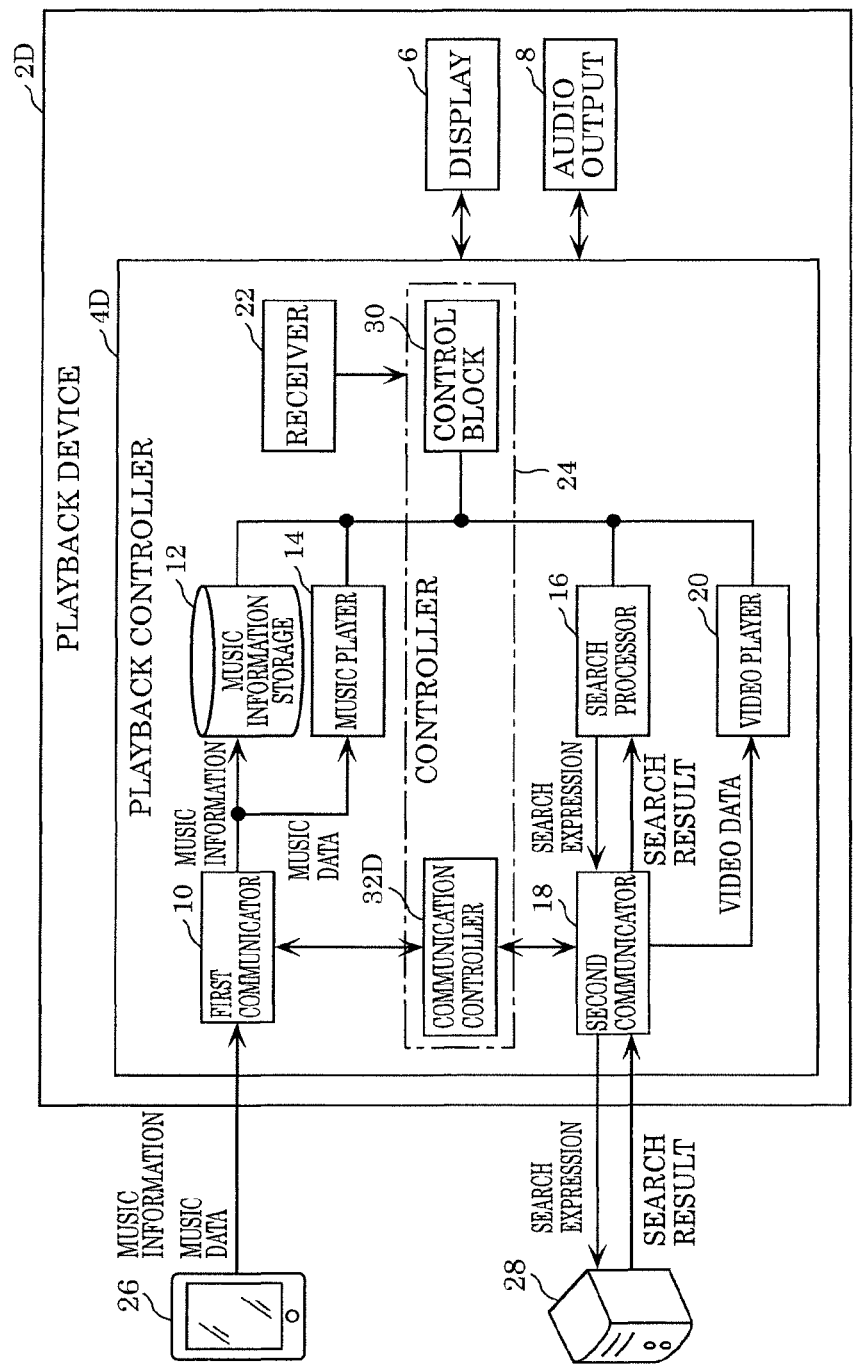
FIG. 11 is a block diagram illustrating a configuration of a playback device according to Embodiment 5.

Now, with reference to FIG. 11, a configuration of playback device 2D according to Embodiment 5 will be described. FIG. 11 is a block diagram illustrating a configuration of playback device 2D according to Embodiment 5.

As illustrated in FIG. 11, playback device 2D according to the present embodiment differs from the counterpart in Embodiment 2 described above in terms of the process of communication controller 32D of playback controller 4D.

In a case where one or more pieces of music information are already stored in music information storage 12 when first communicator 10 receives music data from terminal device 26, communication controller 32D switches the communication mode of second communicator 18 to the high-speed communication mode and causes second communicator 18 to transmit a search expression to server device 28.

For example, receiving a folder list (music information related to all the tracks on a music album) from terminal device 26 before first communicator 10 receives music data from terminal device 26, for example, causes music information related to one or more pieces of music data included in the folder list to be prestored in music information storage 12.

In a case where second communicator 18 has received a search result from server device 28, communication controller 32D switches the communication mode of second communicator 18 from the high-speed communication mode to the low-speed communication mode and causes first communicator 10 to receive music data from terminal device 26.

5-2. Operation of Playback Device

Figure 12:
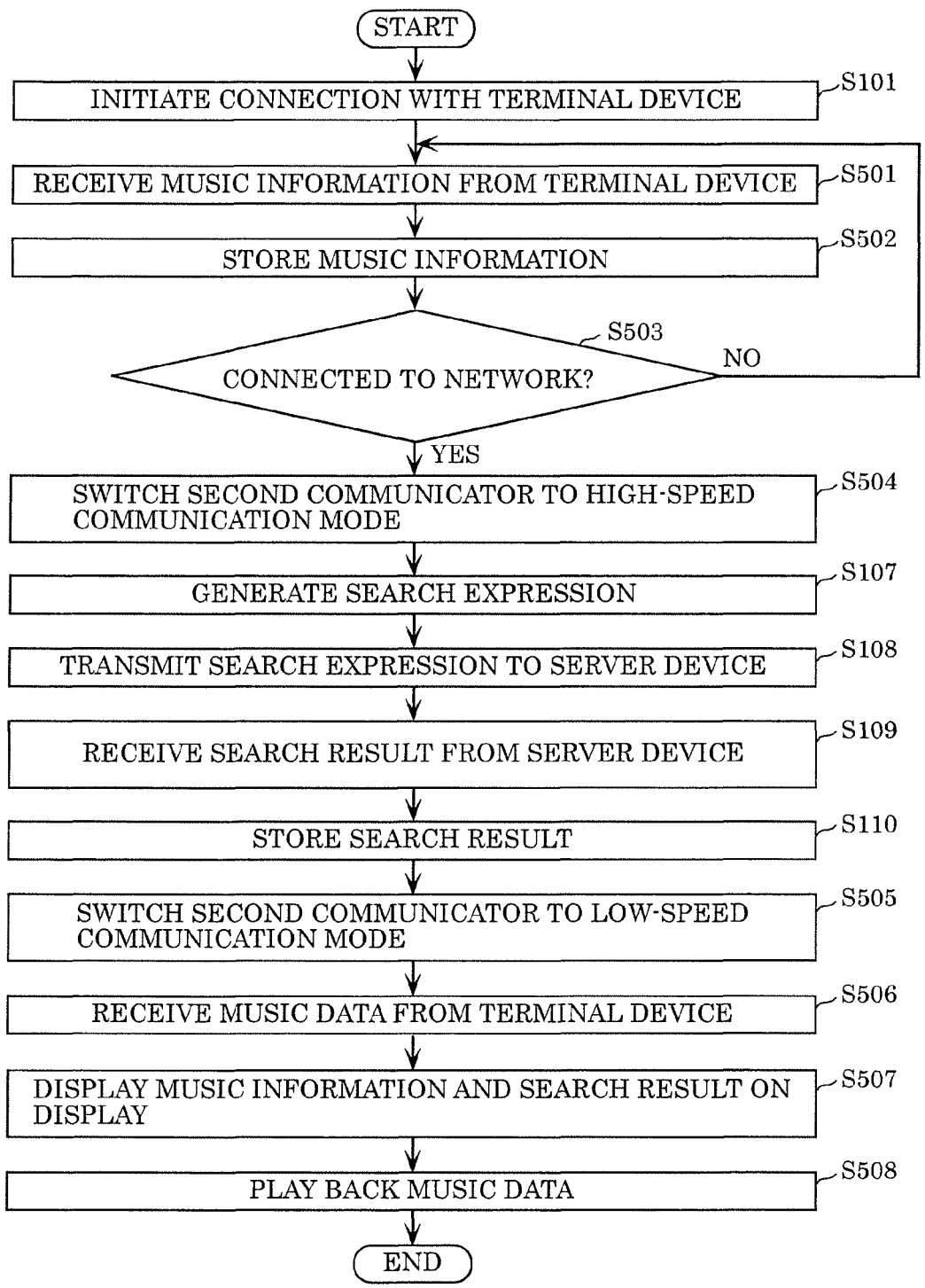
FIG. 12 is a flowchart illustrating a flow of an operation of the playback device according to Embodiment 5.

Now, with reference to FIG. 12, an operation of playback device 2D according to Embodiment 5 will be described. FIG. 12 is a flowchart illustrating a flow of an operation of playback device 2D according to Embodiment 5.

As illustrated in FIG. 12, first, step S101 is executed in a manner similar to that in Embodiment 1 described above. Then, first communicator 10 receives music information (e.g., a folder list) from terminal device 26 (S501). First communicator 10 outputs the received music information to music information storage 12.

Music information storage 12 stores the music information received from first communicator 10 (S502). Search processor 16 determines whether second communicator 18 is connected to the network (S503). In a case where second communicator 18 is not connected to the network (NO in S503), the flow returns to step S501 described above.

In a case where second communicator 18 is connected to the network (YES in S503), communication controller 32D switches the communication mode of second communicator 18 to the high-speed communication mode (S504). Thereafter, steps S107 to S110 are executed in manners similar to those in Embodiment 1 described above. In other words, second communicator 18 communicates with server device 28 in the high-speed communication mode before music data starts being played back.

After step S110, communication controller 32D switches the communication mode of second communicator 18 from the high-speed communication mode to the low-speed communication mode (S505). First communicator 10 receives music data corresponding to the music information already stored in music information storage 12 from terminal device 26 (S506). Control block 30 causes display 6 to display the music information stored in music information storage 12 and the search result (S507). Music player 14 plays back the music data received from first communicator 10 (S508). This allow the music data to be played back in a state in which the communication mode of second communicator 18 has been switched to the low-speed communication mode.

5-3. Advantageous Effects

As described above, in the present embodiment, the first communication scheme and the second communication scheme are each a wireless communication scheme. Playback device 2D further includes communication controller 32D that controls each of first communicator 10 and second communicator 18. In a case where music information is already stored in music information storage 12 when first communicator 10 receives music data from terminal device 26, communication controller 32D switches the communication mode of second communicator 18 to the high-speed communication mode and causes second communicator 18 to transmit a search expression. In a case where second communicator 18 has received a search result, communication controller 32D switches the communication mode of second communicator 18 to the low-speed communication mode having a lower communication speed than the high-speed communication mode and causes first communicator 10 to receive music data from terminal device 26.

With this configuration, second communicator 18 communicates in the high-speed communication mode before music data starts being played back. This can keep radio waves transmitted and received by first communicator 10 and radio waves transmitted and received by second communicator 18 from interfering with each other, and the search for video data can be processed smoothly. Second communicator 18 communicates in the low-speed communication mode while music data is being played back. This can keep radio waves transmitted and received by first communicator 10 and radio waves transmitted and received by second communicator 18 from interfering with each other.

(Variations and Others)

The foregoing embodiments have been described to illustrate the techniques disclosed in the present application. However, the techniques in the present disclosure are not limited to those described above and can also be applied to other embodiments that include modifications, substitutions, additions, omissions, and so on, as appropriate. In addition, a new embodiment can also be conceived of by combining the constituent elements described in the foregoing embodiments.

Thus, other embodiments will be illustrated below.

In the foregoing embodiments, playback controller 4 (4A, 4B, 4C, 4D) includes first communicator 10, second communicator 18, and communication controller 32 (32A, 32B, 32C, 32D), but this is not a limiting example. First communicator 10, second communicator 18, and communication controller 32 (32A, 32B, 32C, 32D) may each be a component separate from playback controller 4 (4A, 4B, 4C, 4D).

In the foregoing embodiments, the user causes music data to be played back with the use of a remote controller, but this it is not a limiting example. For example, the user may cause music data to be played back with the use of terminal device 26. For example, the user may double-tap a play button or the like displayed on a display of terminal device 26, and this may cause a cursor for selecting video information 44a to 44d displayed on playback screen 34 to move to the right (or the left).

In the foregoing embodiments, a search expression (search data) is data for searching for video data related to music data, but this is not a limiting example. For example, a search expression (search data) may be data for searching for, for example but not limited to, the lyrics to a track or the schedule of an artist.

In the foregoing embodiments, the constituent elements may each be implemented by dedicated hardware or through execution of a software program suitable for a corresponding constituent element. The constituent elements may each be implemented as a program executing unit, such as a CPU or a processor, reads out a software program recorded in a recording medium, such as a hard disk or a semiconductor memory, and executes the software program.

A part of whole of the functions of playback device 2 (2A, 2B, 2C, 2D) according to the foregoing embodiments may be implemented as a processor, such as a CPU, executes a program.

The embodiments have been described to illustrate the techniques in the present disclosure. The appended drawings and the detailed descriptions are provided for that purpose.

Therefore, the constituent elements illustrated in the appended drawings and the detailed descriptions may include not only a constituent element that is essential for solving the problem but also a constituent element that is not essential for solving the problem but is merely for illustrating the techniques. Hence, that any constituent element that is not essential is illustrated in the appended drawings and the detailed description is not to admit that such a non-essential constituent element is essential.

Since the foregoing embodiments are merely for illustrating the techniques in the present disclosure, various modifications, substitutions, additions, omissions, and so on can be made within the scope of the claims and equivalents thereof.

INDUSTRIAL APPLICABILITY

A playback device according to the present disclosure can be applied to an audio player or the like for playing back music, for example.

REFERENCE MARKS IN THE DRAWINGS 2, 2A, 2B, 2C, 2D playback device
4, 4A, 4B, 4C, 4D playback controller
6 display
8 audio output
10 first communicator
12 music information storage
14 music player
16 search processor
18 second communicator
20 video player
22 receiver
24 controller
26 terminal device
28 server device
30 control block
32, 32A, 32B, 32C, 32D communication controller
34, 34A playback screen
36 music information display area
38, 46 track information
40 seek bar
42, 42A search result display area
44a, 44b, 44c, 44d video information
48 playback duration
50 thumbnail
52 message

The invention claimed is:

1. A playback device for playing back music data, the playback device comprising:
   a first communicator that communicates with an external device through a first communication scheme and that receives the music data and music information indicating an attribute of the music data from the external device, the first communication scheme being a wireless communication scheme;
   a music information storage that stores the music information received by the first communicator;
   a music player that plays back the music data received by the first communicator;
   a search data generator that, based on the music information, generates search data for searching for information related to the music data;
   a second communicator that communicates via a network through a second communication scheme different from the first communication scheme and that transmits the search data and receives a search result for the search data, the second communication scheme being a wireless communication scheme;
   a search result output that outputs the search result received by the second communicator; and
   a communication controller that, in a case where a wireless communication band of the first communication scheme and a wireless communication band of the second communication scheme are identical, switches a communication mode of the second communicator to either one of a low-speed communication mode and a high-speed communication mode having a higher communication speed than the low-speed communication mode, based on the music information or a playback status of the music data.

2. The playback device according to claim 1, wherein the search result output outputs the search result to a display to cause the display to display the search result.

3. The playback device according to claim 2, wherein
   the search data is data for searching for video data related to the music data,
   the search result includes video information indicating an attribute of the video data,
   the second communicator receives the video data corresponding to the video information included in the search result from a server device, and
   the playback device further includes a video player that plays back the video data received by the second communicator and that causes the display to display the video data.

4. The playback device according to claim 3, further comprising:
   a receiver that receives a user operation, wherein
   in a case where the receiver has received an operation for selecting specific video information from the search result displayed on the display, the second communicator receives specific video data corresponding to the specific video information from the server device, and
   the video player plays back the specific video data received by the second communicator and causes the display to display the specific video data.

5. The playback device according to claim 1 wherein the communication controller switches the communication mode of the second communicator to the low-speed communication mode in a case where the music data is being played back and switches the communication mode of the second communicator to the high-speed communication mode in a case where playback of the music data is being stopped.

6. The playback device according to claim 1, wherein the communication controller switches the communication mode of the second communicator to the low-speed communication mode in a case where a playback position of the music data is at a playback start position and switches the communication mode of the second communicator to the high-speed communication mode in a case where the playback position of the music data is at a playback end position.

7. The playback device according to claim 1, wherein the communication controller switches the communication mode of the second communicator to the low-speed communication mode in a case where buffer underflow has been detected in the music data received by the first communicator.

8. A playback device for playing back music data, the playback device comprising:
- a first communicator that communicates with an external device through a first communication scheme and that receives the music data and music information indicating an attribute of the music data from the external device, the first communication scheme being a wireless communication scheme;
- a music information storage that stores the music information received by the first communicator;
- a music player that plays back the music data received by the first communicator;
- a search data generator that, based on the music information, generates search data for searching for information related to the music data;
- a second communicator that communicates via a network through a second communication scheme different from the first communication scheme and that transmits the search data and receives a search result for the search data, the second communication scheme being a wireless communication scheme;
- a search result output that outputs the search result received by the second communicator; and
- a communication controller that controls each of the first communicator and the second communicator,
- wherein the communication controller:
  - switches a communication mode of the second communicator to a high-speed communication mode and causes the second communicator to transmit the search data in a case where the music information is already stored in the music information storage when the first communicator receives the music data from the external device, and
  - switches the communication mode of the second communicator to a low-speed communication mode having a lower communication speed than the high-speed communication mode and causes the first communicator to receive the music data from the external device in a case where the second communicator has received the search result.

9. A method of controlling a playback device for playing back music data, the method comprising:
  (a) receiving the music data and music information indicating an attribute of the music data from an external device by communicating with the external device through a first communication scheme, the first communication scheme being a wireless communication scheme;
  (b) storing the received music information into a music information storage;
  (c) playing back the received music data;
  (d) generating search data for searching for information related to the music data based on the music information;
  (e) transmitting the search data and receiving a search result for the search data by communicating via a network through a second communication scheme different from the first communication scheme, the second communication scheme being a wireless communication scheme;
  (f) outputting the received search result; and
  (g) in a case where a wireless communication band of the first communication scheme and a wireless communication band of the second communication scheme are identical, switching a communication mode used to transmit the search data or receive the search result to either one of a low-speed communication mode and a high-speed communication mode having a higher communication speed than the low-speed communication mode, based on the music information or a playback status of the music data.

10. A method of controlling a playback device for playing back music data, the method comprising:
  (a) receiving the music data and music information indicating an attribute of the music data from an external device by communicating with the external device through a first communication scheme, the first communication scheme being a wireless communication scheme;
  (b) storing the received music information into a music information storage;
  (c) playing back the received music data;
  (d) generating search data for searching for information related to the music data based on the music information;
  (e) transmitting the search data and receiving a search result for the search data by communicating via a network through a second communication scheme different from the first communication scheme, the second communication scheme being a wireless communication scheme; and
  (f) outputting the received search result,
  wherein control is performed to switch a communication mode used to transmit the search data or receive the search result to a high-speed communication mode and transmit the search data in a case where the music information is already stored in the music information storage when the music data from the external device is received, and
  control is performed to switch the communication mode used to transmit the search data or receive the search result to a low-speed communication mode having a lower communication speed than the high-speed communication mode and receive the music data from the external device in a case where the search result has been received.

* * * * *